United States Patent [19]

Meyer et al.

[11] Patent Number: 5,417,187
[45] Date of Patent: May 23, 1995

[54] METHOD AND DEVICE FOR ADJUSTING THE ANGULAR POSITION OF A CAMSHAFT

[75] Inventors: Klaus-Gerd Meyer, Oldenburg; Gerhard Schneider, München; Günther Heling, Ditzingen, all of Germany

[73] Assignee: Robert Bosch GmbH, Germany

[21] Appl. No.: 260,651

[22] Filed: Jun. 16, 1994

[30] Foreign Application Priority Data

Jun. 16, 1993 [DE] Germany ............. 43 19 882.1
Mar. 12, 1994 [DE] Germany ............. 44 08 425.0

[51] Int. Cl.$^6$ ................. F02D 13/02; F01L 1/34
[52] U.S. Cl. ................. 123/90.17; 123/90.15; 464/1; 464/160
[58] Field of Search ........... 123/90.15, 90.17, 90.31, 123/500, 501; 464/1, 160

[56] References Cited

U.S. PATENT DOCUMENTS

| | | | |
|---|---|---|---|
| 4,928,640 | 5/1990 | van Vuuren et al. | 123/90.17 |
| 5,181,484 | 1/1993 | Kan et al. | 123/90.17 |
| 5,184,578 | 2/1993 | Quinn, Jr. et al. | 123/90.17 |
| 5,289,805 | 3/1994 | Quinn, Jr. et al. | 123/90.15 |
| 5,333,577 | 8/1994 | Shinojima | 123/90.17 |
| 5,363,817 | 11/1994 | Ikeda et al. | 123/90.17 |

FOREIGN PATENT DOCUMENTS

| | | | |
|---|---|---|---|
| 4006950 | 9/1991 | Germany | |
| 2272960 | 6/1994 | United Kingdom | 123/90.17 |

Primary Examiner—Henry C. Yuen
Assistant Examiner—Weilun Lo
Attorney, Agent, or Firm—Kenyon & Kenyon

[57] ABSTRACT

A method to adjust the angular position of a camshaft, which is related to the arc of a crankshaft rotation, to a setpoint angular position with the help of a final controlling element that is triggered by an actuating signal from a controlling device that becomes operational when a control program is run. The final controlling element is able to be triggered in each case by one of three values of the actuating signal; the re-adjustment rate (v_ESTIMATED) of the camshaft is estimated for its level at the beginning of the subsequent program run; from this re-adjustment rate and the known time response (c, v_END) of the camshaft re-adjustment, after the switch is made to the actuating signal from the hold value, a special adjustment angle ($\alpha$_ESTIMATED+) is estimated; and the change is already made from the early or late value of the actuating signal to its hold value when the deviation between the adjustment angle ($\alpha$_ESTIMATED+) and the setpoint angular position lies within a tolerance band. The angular position of the camshaft is thereby able to be adjusted in a rapid and stable manner.

10 Claims, 7 Drawing Sheets

METHOD AND DEVICE FOR ADJUSTING THE ANGULAR POSITION OF A CAMSHAFT

FIELD OF THE INVENTION

The present invention relates to a method and a device for adjusting the angular position of a camshaft.

BACKGROUND OF THE INVENTION

German Patent Application No. DE-A-40 06 950 shows a final controlling element that is triggered by an actuating signal from a PID (proportional-plus-integral-plus-derivative) controller that becomes operational when a control program is run. The final controlling element comprises two helical gears that are in mesh, one of the gears being joined to the camshaft, and the other being driven via a chain by the crankshaft. The gears can be moved toward each other in an axial direction by means of an adjusting mechanism, so as to allow a relative torsion to result between the crankshaft and the camshaft due to the helical teeth. The adjusting mechanism is triggered by the actuating signal. This actuating signal is generated with PID action, starting out from a system deviation, i.e., from the difference between the actual angular position and a setpoint angular position. The setpoint angular position is read out from an engine characteristics map in dependence upon the prevailing operating state of the engine.

This type of PID control method adjusts relatively slowly to a new setpoint value, since the adjustment rate continually declines as the system deviation between the setpoint and actual values becomes smaller.

SUMMARY OF THE INVENTION

An object of the present invention is to specify a method and a device which will allow the angular position of a camshaft to be quickly adjusted to a setpoint angular position.

In accordance with the present invention, a three-step controller is provided, which works with estimated values for the future actual position. An actuating signal can assume one of three values, namely an early value to re-adjust the camshaft toward an early opening of intake valves, a late value to re-adjust it toward a late opening of intake valves, and a hold value to retain the prevailing actual angular position. Each time the control program is run, it is checked which estimated angular position the camshaft will be in at the beginning of the next program run. If it turns out that the camshaft will already be near enough to the setpoint angular position to reach it itself if the change is made to the hold value, then this change is made, although the actual angular position still deviates at that moment from the setpoint angular position. This allows a considerably faster adjustment than does PID control, since in the case of PID control, the closer the actual angular position gets to the setpoint angular position, the greater the drop in the re-adjustment rate is. On the other hand, the method according to the invention allows the re-adjustment to be made at a maximum re-adjustment rate, in that the early or the late value is output only until the camshaft is just far enough away from the setpoint angular position to still run into it because of the inertia of the adjusting mechanism, even when the switch is made to the hold value.

The adjusting mechanism typically comprises a hydraulic valve having two chambers, which are supplied with different quantities of oil. If only one chamber receives oil, then a re-adjustment is made toward the early orientation; if only the other chamber receives oil, then a re-adjustment is made toward the late orientation; and if both chambers receive essentially the same amount of oil, then the prevailing adjustment value is retained. This supplying with the same amount of oil in each case is supposedly described by a 50% pulse duty factor of triggering signals for control valves. In practice, slightly different oil quantities, thus pulse duty factors that deviate somewhat from 50% are required to retain the adjusting mechanism in its position. It can be that different pulse duty factors are also required for the hold value, depending on whether a holding is required after a re-adjustment toward the early orientation or after a re-adjustment toward the late orientation. To optimally adjust the hold value, an adaptation of the hold value may be undertaken in accordance with an embodiment of the present invention.

According to another embodiment of the present invention, an adaptation is made of the final adjustment-rate values, upon which calculations for determining the current position are based. In this manner, estimated values for the current position can also be determined very accurately when the operating parameters of the adjusting mechanism change, such as the viscosity of the hydraulic fluid subsequent to the heating of the same.

DETAILED DESCRIPTION OF THE INVENTION

Figure 1:
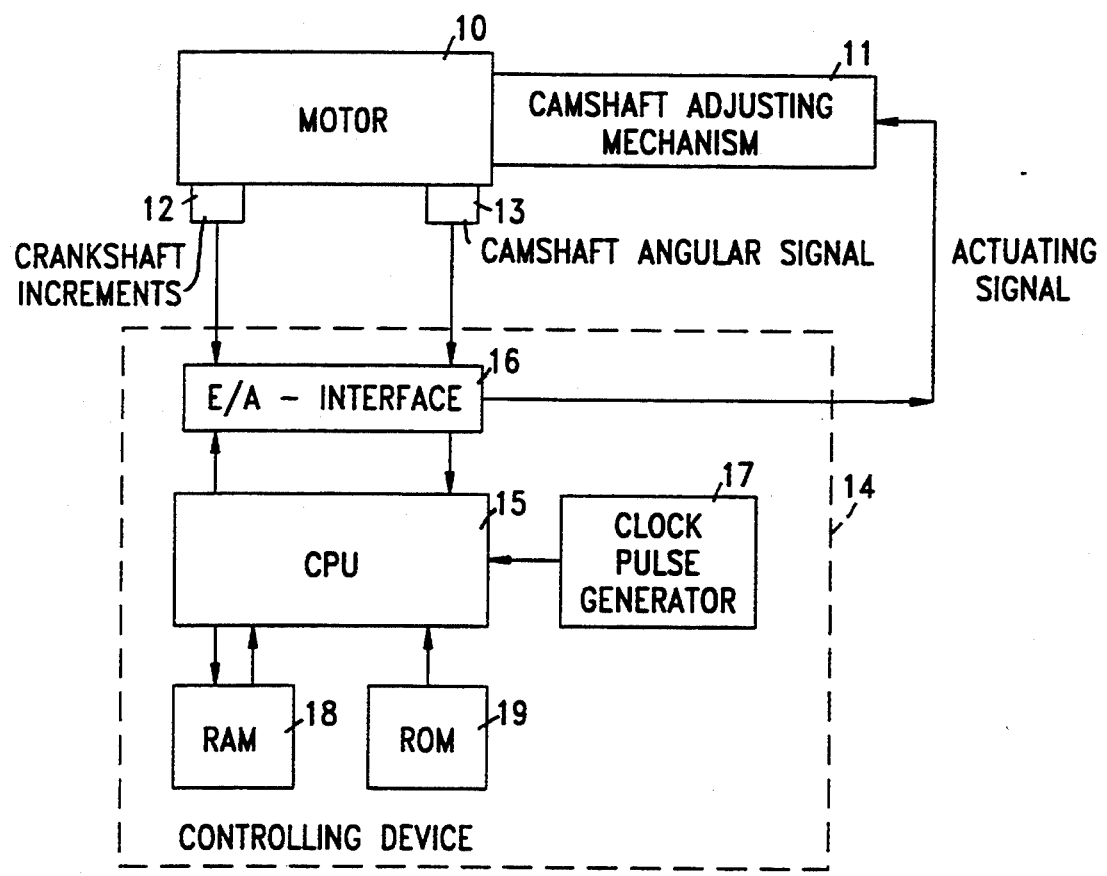
FIG. 1 is a block diagram of an embodiment of a device according to the present invention.

FIG. 1 shows an internal combustion engine 10 having a camshaft adjusting mechanism 11, a crankshaft increment detector 12, a camshaft sensing element 13, and a controlling device 14. The controlling device 14 is a microcomputer having a CPU 15, an I/O interface 16, a clock-pulse generator 17, a RAM 18, and a ROM 19. The ROM stores programs whose function will be clarified with reference to FIGS. 2 through 6.

In accordance with an embodiment of the present invention, the crankshaft increment detector 12 emits a crankshaft incremental signal for every 6° of crankshaft rotation. The camshaft sensing element 13 emits a camshaft angular signal after each 90° rotation of the camshaft. At an engine speed of 600 rpm, a camshaft angular signal would therefore occur every 50 ms.

The camshaft adjusting mechanism 11 comprises a gear that drives the camshaft and a gear that is driven by the crankshaft, each of the gears having helical teeth. These two gears are pushed toward each other in the axial direction by means of a hydraulic device, through which means a total adjustment stroke of 40° is possible in this illustrative embodiment. The hydraulic mechanism has two chambers which are supplied with different quantities of oil. To retain the position of the hydraulic mechanism, both chambers receive approximately the same amount of oil. As far as the triggering is concerned, this means a pulse duty factor of about 50% for the chambers. When a re-adjustment is made toward the early orientation, the pulse duty factor is nearly 0%, and when a re-adjustment is made toward the late orientation, it is nearly 100%. These respective pulse duty factors are set when the actuating signal supplied by the controlling device 14 to the camshaft adjusting mechanism 11 either has a hold value, an early value, or a late value.

Functional Overview

Figure 2A:
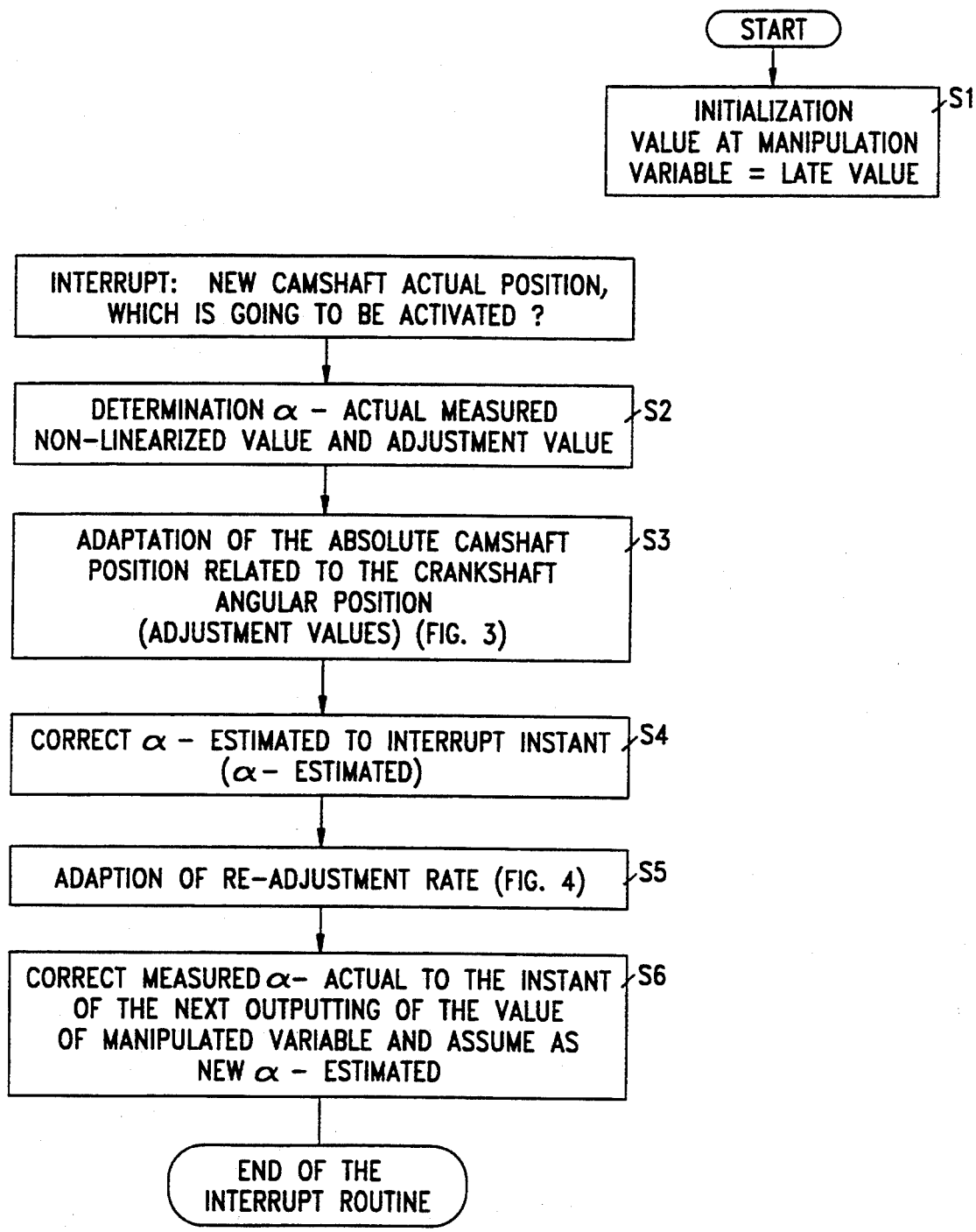
FIG. 2 is a flow chart of an embodiment of a method according to the present invention.
Figure 2B:
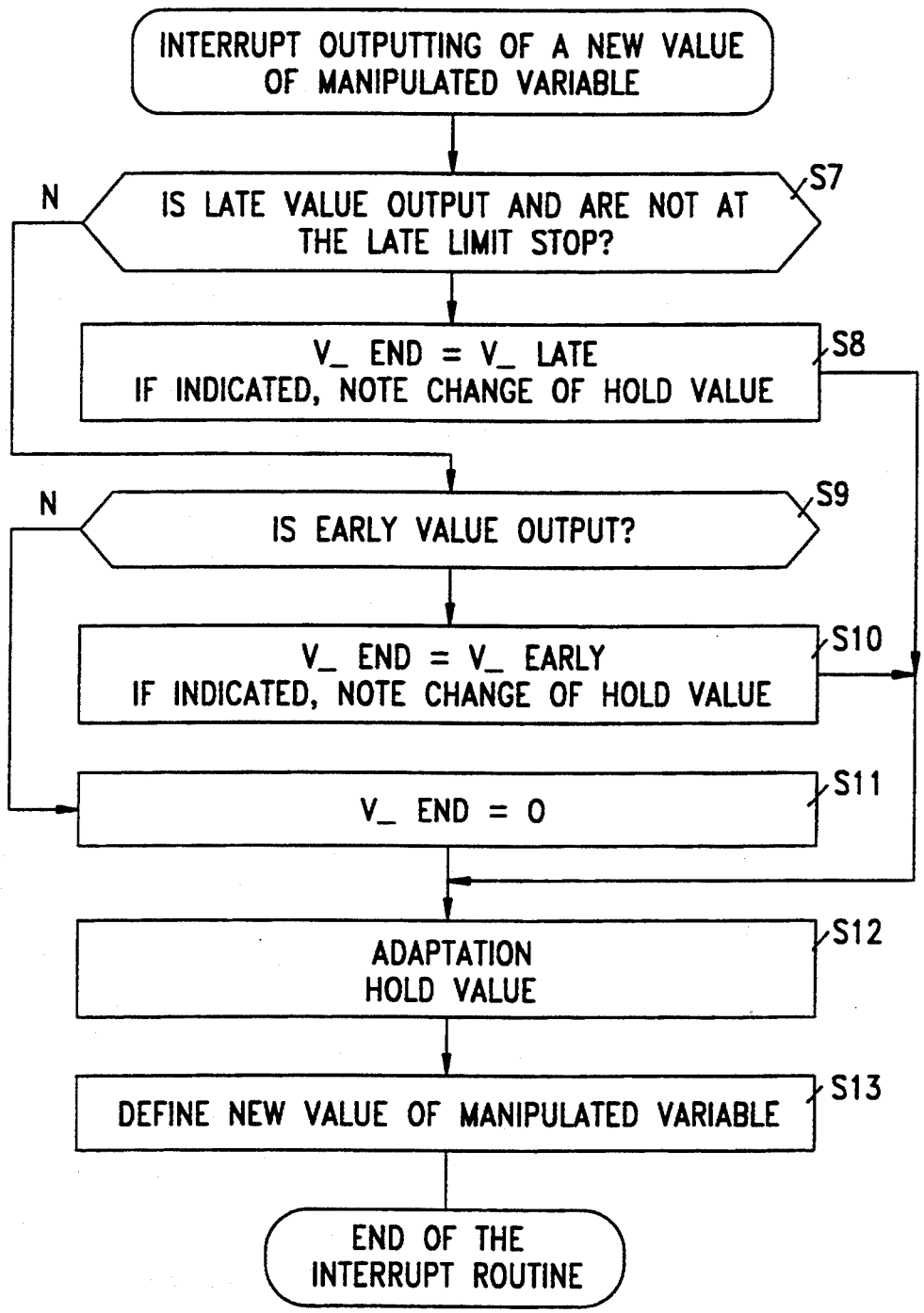
Figure 3:
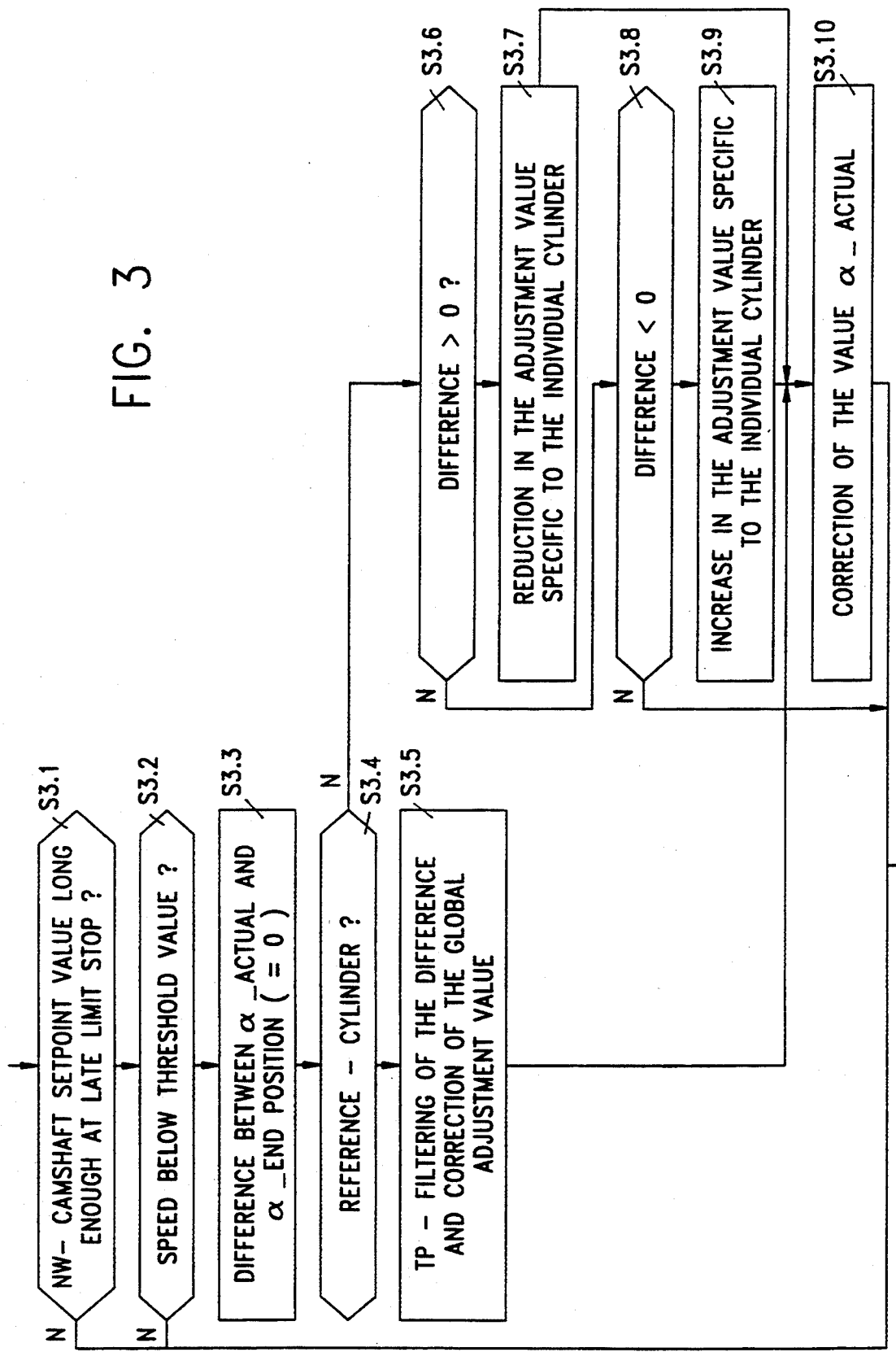
FIG. 3 is a flow chart for a procedure for determining the adjustment values for the angular position of a camshaft.
Figure 4:
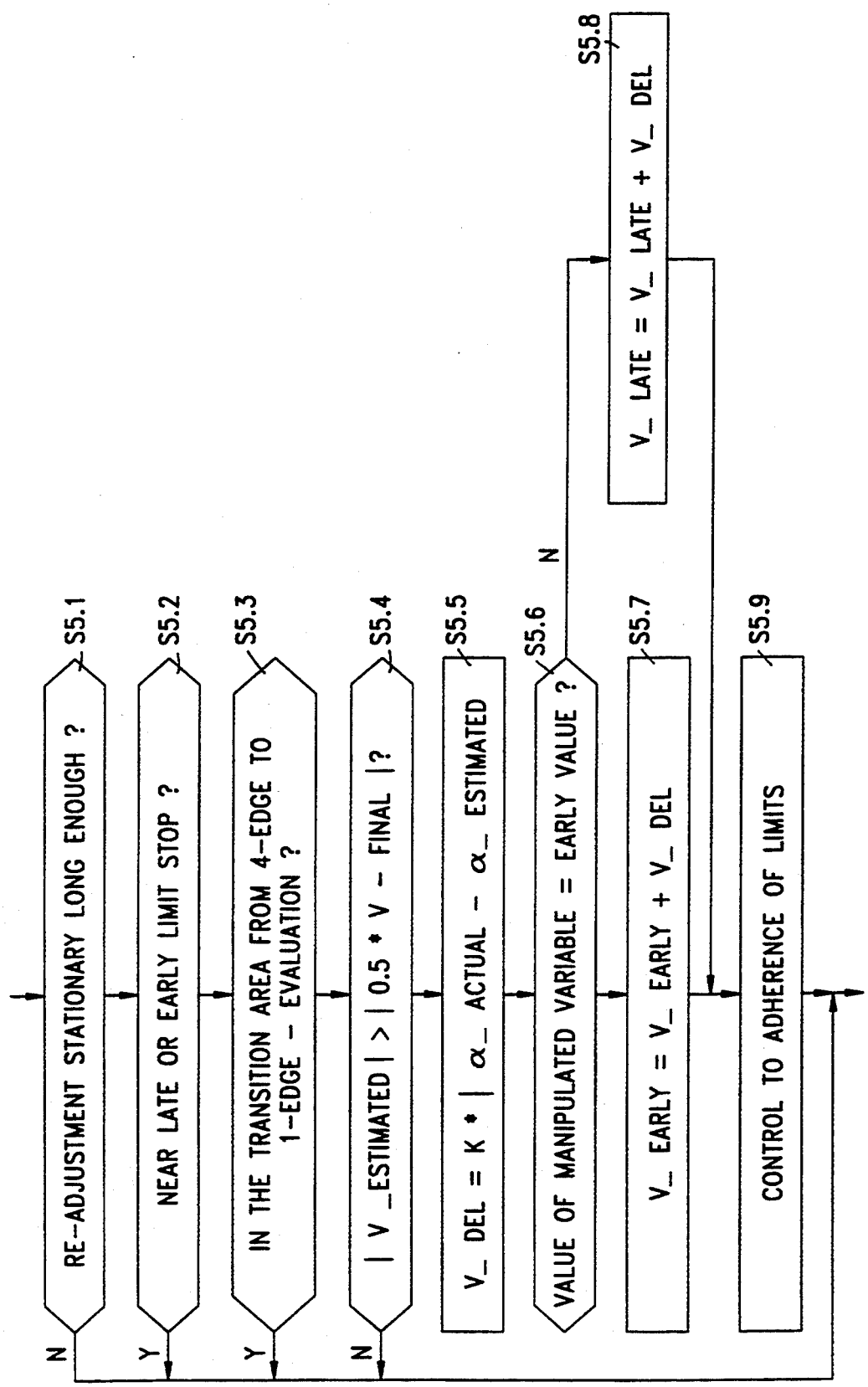
FIG. 4 is a flow chart for a procedure for adapting the final adjustment rate of the angular position of the camshaft.
Figure 5:
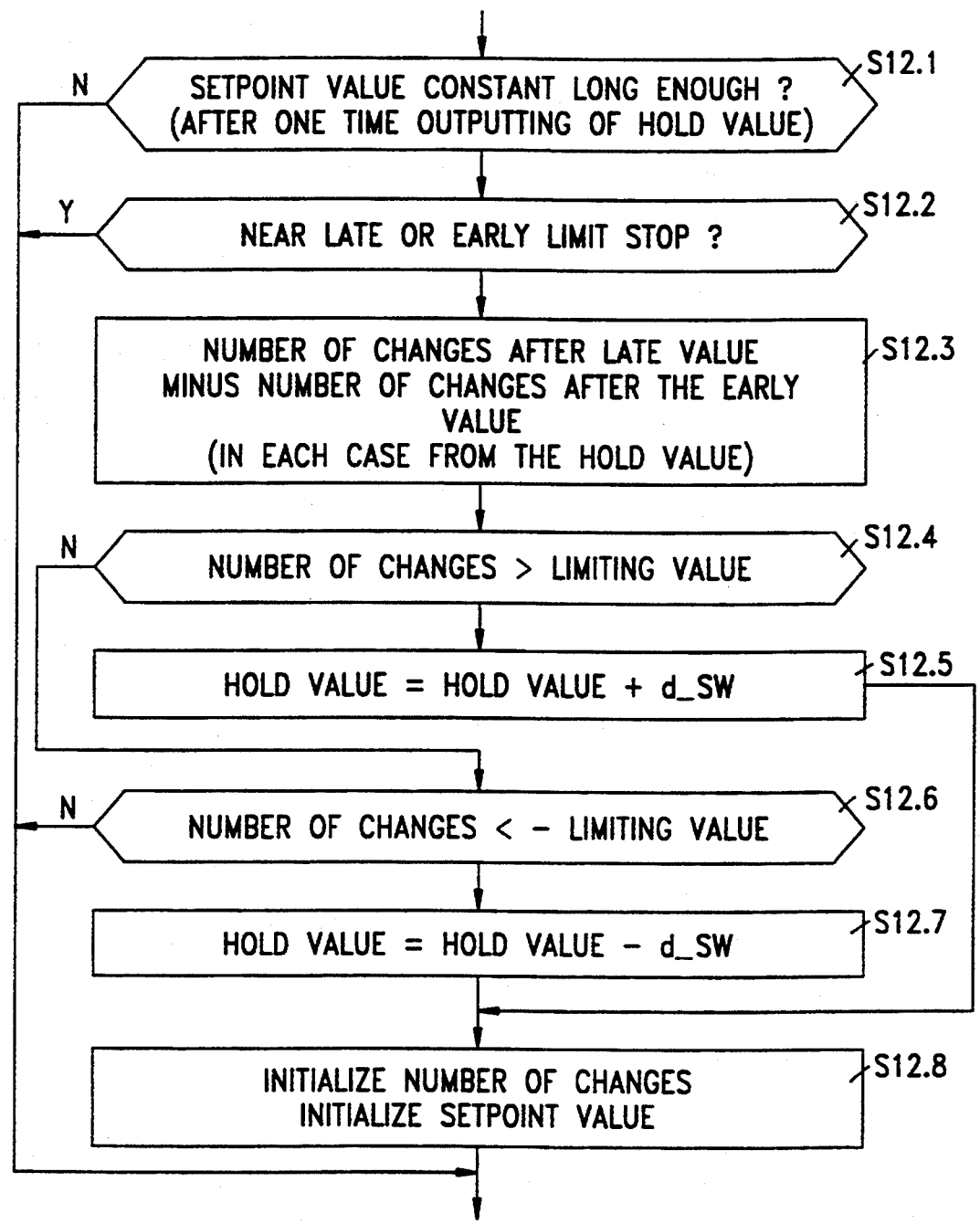
FIG. 5 is a flow chart for a procedure for adapting the hold value of the actuating signal for adjusting the setpoint angular position.
Figure 6:
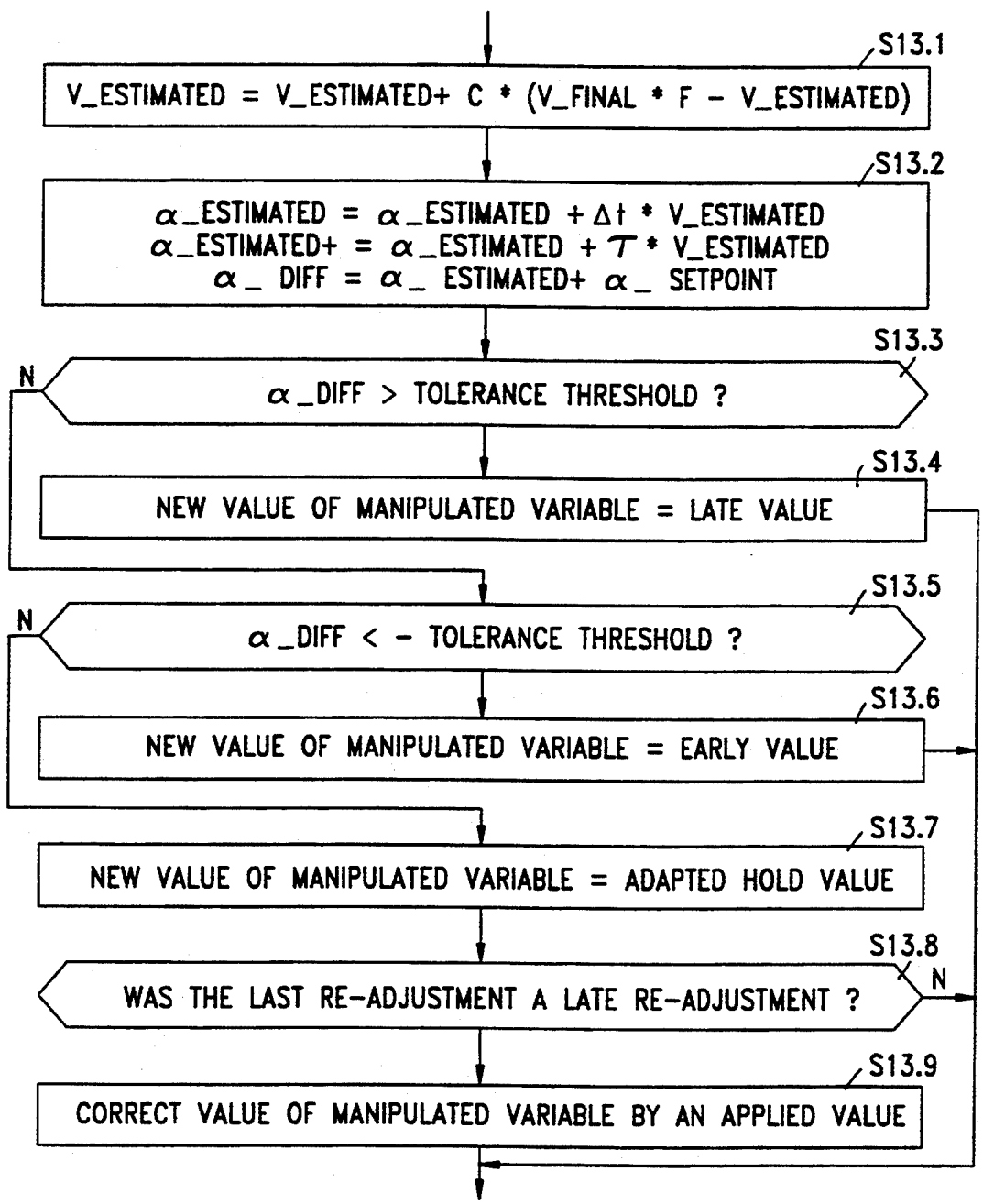
FIG. 6 is a flow chart for a procedure for determining the new value of a manipulated variable.

An overall view of the programs stored in the ROM 19 for determining the current value of the actuating signal will now be clarified on the basis of the flow chart of FIG. 2. The programs are comprised of an initialization program, a background program (not shown) and two interrupt routines.

After start-up of the procedure, an initialization takes place in a step s1. In this step, inter alia, certain specified variables, which are used in the calculations clarified in the following, are set. These variables are applied on a test stand for each engine type and for each type of camshaft adjusting mechanism 11. In accordance with an embodiment of the present invention, the applied values do not have to be determined with any special accuracy, since various adaptations are made during the program run to modify applied values. In the initialization step s1, a variable "next value of manipulated variable" is set to the late value of the actuating signal. The initialization step s1 is run through only once at the start of the functional sequence in accordance with FIG. 2.

The current values of the engine performance quantities, such as the values pertaining to speed, throttle-valve position, and engine temperature, are acquired in the background program. With the help of these values, the setpoint angular position of the camshaft (NW) corresponding to the current operating state of the engine 10 is determined through the evaluation of characteristics and engine characteristics maps. It is furthermore determined in this program section in dependence upon the speed whether all signals of the camshaft angular signal, for example four signals per camshaft rotation, are evaluated, or whether merely one of the signals is evaluated for each camshaft rotation, which, for example, is sufficient at higher speeds of, e.g., over 3000 rpm and reduces computational work. To switch between an operation using all signals and an operation using only one of the signals, a hysteresis of a few (Zig) rpm is provided.

The two interrupt routines illustrated in addition to the initialization program in FIG. 2 are initiated under the following conditions. The routine on the left side of FIG. 2 is initiated upon the occurrence of a camshaft angular signal, and as described above, all angular signals are utilized at low speeds, and only one signal is utilized per camshaft rotation at higher speeds. At 600 rpm of the internal combustion engine, this routine is started every 50 ms in the above mentioned case. In contrast, the routine on the right, which is for determining a new value of a manipulated variable for the camshaft adjusting mechanism 11, is always initiated when the value of manipulated variable determined during the previous run of the routine is output. This readout operation takes place within a fixed time base having a period of, for example, 5 ms.

The left routine, which is substantially used for adaptation purposes, comprises steps s2 through s6. In step s2, the actual value $\alpha$_ACTUAL of the camshaft angular position is determined on the basis of the non-linearized value, which was measured upon the occurrence of the interrupt, under consideration of adjustment values. The adjustment values are determined during final assembly of a motor vehicle and are adapted in step s3, which is clarified further below with reference to FIG. 3.

The value calculated in a step s13.2, which will be clarified further below, is corrected in step s4 for the estimated camshaft angular position $\alpha_{13}$ ESTIMATED, on the basis of the actual value at the time of interrupt. In this manner, a corrected estimated value $\alpha_{13}$ ESTIMATED' is obtained. The correction can be made, for example, in that angular change, which the camshaft covers under consideration of an estimated re-adjustment rate v_ESTIMATED in the period of time between the time of interrupt for the left routine and the next time of interrupt for the right routine, is added to the actual value, which had been measured for the left routine at the time of interrupt. The resultant value $\alpha_{13}$ ESTIMATED' is used in the following step s5 for adapting the re-adjustment rate of the camshaft, provided that certain conditions have been fulfilled. More precisely stated, a final re-adjustment rate v_EARLY toward an early orientation and a final re-adjustment rate v_LATE toward a late orientation are adapted. Details will be clarified below on the basis of the flow chart of FIG. 4.

The estimated camshaft angular position $\alpha_{13}$ ESTIMATED is calculated in step s6, under consideration of the measured and corrected actual value of the camshaft angular position, and stored as a value, as exists when the right routine is initiated as the result of the outputting of the next value of manipulated variable. This right routine comprises steps s7 through s13, in which primarily the value of manipulated variable is calculated, as is output upon the next initiation of this routine. Steps s7 through s11 are used to set a variable v_END either to the value already mentioned v_LATE or to the value v_EARLY, or to 0. v_END in this case is the respect to the crankshaft, when it is triggered over a longer period of time by the actuating signal for re-adjusting toward a late orientation or toward an early orientation. The variable v_END Is required in calculating the value of manipulated variable in accordance with step s13. In addition, in steps s8 and s10 it is determined whether a change from the hold value toward the late value or rather toward the early value took place. After these steps, the hold value is adapted (step s12, FIG. 5), and the new value of manipulated variable is determined (step s13, FIG. 6).

Adaptation of the Adjustment Values

The above-mentioned adjustment values pertain to the problem that the angle between the top dead center of a cylinder and the corresponding signal from the camshaft sensing element 13 are not precisely fixed, and that the camshaft sensing element does not output its four signals precisely every 90° per camshaft rotation (in the illustrative embodiment), but rather, for example, 1° (instead of 0°) after the top dead center, as well as 89°, 178° and 272° after the same. To obtain the corrected values of 0°, 90°, 180° and 270°, a current adjustment value, which amounts for the four signals in the example to −1°, +1°, +2° or −2°, must be subtracted from the current measured value, which initiates the left interrupt routine, in order to obtain the corrected actual value $\alpha_{13}$ ACTUAL in step s2. In the above embodiment, a global adjustment value, as well as adjustment values pertaining to individual signals are set during the final assembly and during further operation of the motor vehicle through application of the method illustrated by FIG. 3, which comprises steps s3.1 through s3.10.

Step s3.1 checks whether the setpoint value of the camshaft angular position corresponds long enough to the late limit stop, so that one can assume that the late limit stop has been reached. If the specified time of, for example, 0.5 s has not yet elapsed, then step s4 is reached immediately. Otherwise, it is checked in step s4.2, whether the speed lies below an applicable threshold of, for example, 3000 rpm. If this is not the case, step s4 is likewise immediately reached. These steps ensure that fault influences are ruled out, wherever possible, when the adaptation is made, and that computational work is lessened.

In step s3.3, the difference is formed between the corrected actual value $\alpha_{13}$ ACTUAL for the final position and the specified value zero as an angle $\alpha\_$ADJUSTMENT for the final position. In step s3.4, the distinction is made whether the global adjustment value is supposed to be corrected, which is valid for a reference cylinder, or a value that pertains to an individual signal. If the current camshaft angular signal belongs to the reference cylinder, then the global adjustment value is changed in step s3.5 by an applicable portion of the determined difference, which is achieved by means of low-pass filtering, so that the assumption can be made that the difference will be smaller during the next program run. After that, step s3.10 is reached.

If it was determined in step s3.4 that an adjustment value pertaining to an individual signal must be corrected, then it is checked in step s3.6 whether the difference determined in step s3.3 is greater than "0". If this is the case, the adjustment value belonging to the affected cylinder is modified in step s3.7 by a fixed amount in a direction which will allow the assumption to be made that, during the next program run, the difference will be smaller or a value with an opposite operational sign will occur. After that, step s3.10 is reached.

If it was established in step s3.6 that the difference is not greater than "0", then it is checked in step s3.8 whether the difference determined in step s3.3 is smaller than "0". If this is the case, the adjustment value belonging to the affected cylinder is increased in step s3.9 by a fixed amount in a direction which will allow the assumption to be made that, during the next program run, the difference will be smaller or a value with an opposite operational sign will occur. After that, step s3.10 is reached.

In step s3.10, the measured value of the camshaft angular position, which had already been corrected once in step s2, is corrected under consideration of the new corresponding adjustment value. After that, step s4 follows.

Adaptation of the Re-adjustment Rates

The final re-adjustment rate v$\_$END enters decisively into the calculation of the re-adjustment rate v$\_$ESTIMATED, and thus into the calculation of the values dependent upon this calculation. To ensure that this rate is continually known as accurately as possible, in the illustrative embodiment, an adaptation continually takes place in step s5, which comprises the substeps s5.1 through s5.9.

Conditions under which the adaptation of the re-adjustment adjustment rate may take place are checked in steps s5.1, s5.2, s5.3 and s5.4. If one of the conditions is not fulfilled, step s6 is immediately reached. Step s5.1 checks whether the duration of the re-adjustment in one direction reaches an applicable time limit of, for example, 50 ms. Thus, the starting range of a re-adjustment, in which one cannot start out from defined states, is supposed to be masked out. Step s5.2 checks whether the camshaft angular position is situated close to one of the two limit-stop positions, since in these cases as well, one cannot start out from defined states.

Step s5.3 checks whether the engine speed is in the transition range, in which the switch is made between the evaluation of all camshaft angular signals and the evaluation of only one signal for each camshaft rotation. Since different re-adjustment rates may occur given the same physical conditions because of the different evaluation procedure, an adaptation in the transition range does not make sense.

The adaptation is made in that the measured camshaft angular position $\alpha_{13}$ ACTUAL is compared to the estimated camshaft angular position $\alpha_{13}$ ESTIMATED'. This estimated angular position is determined with the help of the estimated re-adjustment rate v$\_$ESTIMATED. If both camshaft angular positions do not conform, the assumption is made that the value v$\_$ESTIMATED was not correctly determined. v$\_$ESTIMATED is calculated from the two final re-adjustment rates v$\_$EARLY or v$\_$LATE. If one of the two values is supposed to be adapted, it must be ensured that a preceding value does not too strongly affect v$\_$ESTIMATED. An example of this is when after the first outputting of a requirement for a re-adjustment in the late direction, different conditions are achieved after a certain time span, when the re-adjustment is made in the late direction after a hold state, than when it is made after a re-adjustment in the early direction. To be substantially independent of such differences, the test is performed in accordance with step s5.4.

In step s5.5, a correction value of v$\_$del for the re-adjustment rate is calculated from the difference between the estimated camshaft angular position $\alpha_{13}$ ESTIMATED' and the actual angular position $\alpha_{13}$ ACTUAL, using a scaling factor k of, for example, 1°/2 sec. This correction value is used in steps 5.7 or 5.8 in order to vary the final re-adjustment rates for early or late re-adjustment in accordance with the formulas given in FIG. 4, after the distinction had been made in step s5.6 whether a readjustment had just made toward the early orientation or toward the late orientation.

Finally the adherence to lower and upper limits is monitored in step s5.9.

Adaptation of the Actuating Value for Holding

As already explained, when the hold value is output, the angular position of the camshaft is supposed to remain unchanged. In the ideal case, the hold value would have the pulse duty factor indicated above of 50%. In practice, the required pulse duty factor, which represents the hold value, deviates from 50% and amounts, for example, to 59%. Moreover, as a rule, different hold values are required in dependence upon whether the late value or the early value had been previously output. To adapt such deviations of the hold value from a pulse duty factor of 50% to the application prevailing at any one time, the adaptation step s12 is executed, which comprises the substeps s12.1 through s12.8.

In step s12.1, the query is made whether the setpoint value of the camshaft angular position is constant over a long enough period of time (delay, for example, of 50 msec) after the one-time outputting of the hold value, so that one can start out from the assumption that re-adjustments that occur in the following are not required for correcting a hold value that is not adapted exactly. If this is not the case, step s13 is immediately reached.

Step s12.2 checks whether the camshaft angular position is situated close to one of the two limit stops. If this is the case, step s13 is immediately reached, since in this case an adaptation of the hold value cannot be carried out reliably.

After it is ensured that the adaptation of the hold value can be carried out, the main part of the adaptation begins in the following step s12.3.

If the hold value was changed to the early or late value, then this is entered in step s8 or s10; and the difference in the change in both directions is evaluated in step s12.4 within a time span of 250 msec in the case of the illustrative embodiment (change toward a late orientation less the change toward the early orientation). If the difference exceeds an applied limiting value of, for example, four changes, the hold value is increased in step s14.5 by a small specified step size of $d_{sw}$, which represents 0.4% in the pulse-duty factor of the illustrative embodiment. After that, step s12.8 is reached.

If it turns out in step s12.6 that the number of the change toward the early readjustment exceeds the number of the change toward the late readjustment by the applicable limiting value, then the hold value is decreased by a small specified step size of $d_{sw}$ in step s12.7, which represents 0.4% in the pulse-duty factor of the illustrative embodiment. After that, step s12.8 is reached.

In step s12.8, after the adaptation has taken place, the two values for the completed readjustment change are initialized (set to 0), and the stored setpoint value, which is used in step s12.1, is likewise initialized (set to 0), to be able to recognize a change in the same.

Determining the New Value of Manipulated Variable

Step s13 for determining the new value of manipulated variable, which will be retrieved at the next start-up of the right routine, comprises substeps s13.1 through s13.9.

The estimated readjustment rate v_ESTIMATED, which is valid for the re-adjustment up until the next program run, is determined in step s13.1. If one starts out from the assumption that the re-adjustment rate of the controlled system behaves comparably to a first-order low-pass filter, then it is necessary to know the final value of the re-adjustment rate. This recognition takes place in step s8 (for late re-adjustment), and in step s10 (for early readjustment). The final value v_END is multiplied by a factor F, which is dependent, in particular, upon the speed n of the engine. This is the case because the final rate v_END depends relatively heavily on the rotational frequency of the camshaft. For example, below an engine speed of 1,500 rpm, the maximum pressure of the hydraulic oil driving the camshaft adjusting mechanism 11 is not yet reached. Moreover, the transition for the evaluation of all four camshaft signals can be considered in this case for evaluating one signal (or vice versa).

The calculation of the estimated re-adjustment rate v_ESTIMATED is performed using a customary digital, first-order transition function, based on a constant c, which is applied in dependence upon the time constants $\tau$ of the camshaft re-adjustment device 11. Generally, the time constants for the two moving directions differ from one another, which is why a value of c_LATE, or c_EARLY can be adjusted in step s13.1.

The angular position $\alpha_{13}$ ESTIMATED of the camshaft, which is predicted for the beginning of the next right interrupt routine, is estimated in step s13.2. This is achieved with the formula indicated in step s13.2, supported by the estimated value $\alpha$_ESTIMATED calculated during the last run, the specified time span dt between two runs of the right interrupt routine (5 ms), and by the estimated value calculated in step s13.1 for the rate v_ESTIMATED.

In addition, the calculation is performed in step s13.2 for that value of the camshaft angular position, which would be reached were the hold value to be output at the start of the next program run, and were the camshaft to still move then somewhat farther because of the inertia of the entire controlled system. The value $\alpha_{13}$ ESTIMATED+ calculated with the formula indicated in this step defines which value is supposed to be output at the start of the next run of the right interrupt routine, then in the case of a continuing re-adjustment, the aim is to already make the transition to the hold value if the setpoint has not yet been reached; however, because of the low-pass behavior of the camshaft adjusting mechanism 11, one must start out from the assumption that the actual value will reach the setpoint value, even if only the hold value is to be output. This measure allows the camshaft to be driven for quite a long time at a maximum re-adjustment rate, enabling it to arrive exactly in the setpoint angular position, when the hold value is output already somewhat beforehand. In this manner, a specific setpoint value can be adjusted quite quickly. The decision which value to output at the start of the next run of the right interrupt routine is made during the current run in that a difference $\alpha$_DIF is formed between the value $\alpha$_ESTIMATED+ and the setpoint value $\alpha$_SETPOINT.

Step s13.3 checks whether the difference lies above an applicable tolerance threshold. If this is the case, it is entered in step s13.4 that the new value of manipulated variable should become the late value, and the routine run is ended. Otherwise, step s13.5 checks whether the difference $\alpha$_DIF lies below the negated value of the tolerance threshold. If this is the case, it is entered in step s13.6 that the new value of manipulated variable should become the early value, and the routine run is ended. Otherwise, it is entered in step s13.7 that the new value of manipulated variable should become the adapted hold value.

In this case, step s13.8 checks whether the last requested re-adjustment had been toward a late orientation. If this is the case, the hold value to be output is increased in step s13.9 by an applicable correction value. In this manner, a hysteresis can be considered in the characteristic of the camshaft adjusting mechanism 11, which has the following effect: if a re-adjustment is made toward the early orientation, then a value of, for example, 56% is subsequently required to keep the camshaft angular position constant. If, on the other hand, a re-adjustment is made toward the late orientation, a value of, for example, 59% is subsequently required to keep the camshaft angular position constant.

After step s13.8 or step s13.9, the right routine run is completed.

In the illustrative embodiment, four camshaft angular signals are emitted per camshaft rotation. However, it is equally possible to work with less, as well as with more signals. The fewer signals that are output per rotation, the longer the time spans are over which one must work with estimated values. Conversely, more frequent measurements lead to fewer estimated values and, consequently, in principle to a more precise controllability. It must be taken into consideration, however, that each measurement means additional computational work, since not only the measured angle, but also the measuring instant must be stored with each measurement; and because with the help of these two quantities and the variance from a current computing operation, it must then be determined to what extent the measured value is related to the current instant. Therefore, one will attempt to make do with as few measured values as possible. The more precisely one knows of the time response of the entire structure, the more reliable the estimations become, and with all the fewer measured values one can work. It is also possible, given relatively low speeds, for example under 2,000 rpm, to evaluate four signals per camshaft rotation, on the other hand, at higher speeds, only two signals.

The adaptations can also be performed differently than described. For example, to adapt the final re-adjustment rate, the procedure can be such that when the late or early value is output relatively slowly, the system waits until the adjusting mechanism reaches its final velocity, and then this final velocity is determined with the help of two consecutive angular measurements. The hold value can be adapted, for example, in that the system checks whether a camshaft angular position has been altered when the setpoint angular position is constantly maintained.

This can only be the case when the actual value has shifted due to an inappropriate hold value. If a late re-adjustment happens, this indicates that the hold value does not actually hold the angular position, but rather that it moves in the late direction. The pulse duty factor is then somewhat lowered. In the reverse instance, it is somewhat increased.

A typical value of the final re-adjustment rate amounts to 20°/100 msec. A typical value for the time constant of the system for the first-order transition, after switching over to the hold signal, is 40 msec.

In the illustrative embodiment, out of the parameters c and v_END determining the first-order transient response in accordance with the equation in step s13.1, only the final re-adjustment rate of v_END is adapted. However, it is possible to use a method, similar to the one described for FIG. 4, to modify the constant c in small steps to better approach the current dynamic behavior.

What is claimed is:

1. A method for adjusting an angular position of a camshaft to a setpoint angular position via a final controlling element, the final controlling element triggered by an actuating signal, the actuating signal becoming operational when a control program is run, the angular position related to an arc of a crankshaft rotation, the method comprising the steps of:

triggering the final controlling element in each case by one of three values of the actuating signal, an early value to re-adjust the camshaft toward an early opening of intake valves of an internal-combustion engine, a late value to re-adjust the camshaft toward a late opening of intake valves, and a hold value to retain the prevailing actual angular position;

estimating a re-adjustment rate (v_ESTIMATED) of the camshaft at a beginning of a subsequent program run;

estimating an adjustment angle ($\alpha_{13}$ ESTIMATED+), the adjustment angle being an angular position by which the camshaft would still change if the actuating signal were changed to the hold value at the beginning of a next program run, the adjustment angle estimated from the re-adjustment rate and a known time response (c, v_ESTIMATED) of the camshaft re-adjustment after the actuating signal is switched from the hold value to one of the early value and the late value; and changing the actuating signal to the hold value when a deviation between the adjustment angle ($\alpha_{13}$ ESTIMATED+) and the setpoint angular position lies within a tolerance band.

2. The method according to claim 1, wherein the re-adjustment rate (v_ESTIMATED) is estimated for its probable level at the beginning of the subsequent program run, from a current re-adjustment rate using a first-order transition function with an applied time constant (c, $\Delta t$) and final re-adjustment rate (v_END).

3. The method according to claim 2, further comprising the step of adapting the time constant.

4. The method according to claim 2, wherein further comprising the step of adapting the final re-adjustment rate (v_END).

5. The method according to claim 4, wherein the step of adapting the final re-adjustment rate includes the steps of:

a) generating a signal indicating the angular position of the camshaft;

b) acquiring the signal as an actual value;

b) determining an estimated value for the angular position when the signal is generated;

c) forming a difference between the estimated value and the actual value; and d) altering the final re-adjustment rate is by a small specified increment so that one of a smaller difference and such a difference with an opposite operational sign is to be expected the next time steps a) through c) are carried out.

6. The method according to claim 1, further comprising the step of adapting the hold value.

7. The method according to claim 6, wherein the step of adapting the hold value includes the steps of:

a) monitoring whether the setpoint value remains virtually constant after the hold value is output once;

b) recording the change from the hold value to one of the early and late value after expiration of a time delay if the setpoint value is virtually constant; and c) altering the hold value by a small specified increment if the amount of the difference from the changes exceeds a limiting value so that one of a smaller difference and such a difference with an opposite operational sign is to be expected when steps a) and b) are carried out once more.

8. The method according to claim 1, further comprising the step of correcting each actual value of the angular position of the camshaft with adjustment values which allow for deviations with respect to the position of the individual camshaft signals relative to the crankshaft signals.

9. The method according to claim 8, wherein the adjustment values are determined, the determination of the adjustment values including the following steps:
a) re-adjusting the camshaft to an end position;
b) acquiring the actual values measured during one rotation of the camshaft; and
c) altering the current adjustment value by a small specified increment, based on the difference between each actual value and the corresponding setpoint value at the time, so that one of a smaller difference and such a difference with an opposite operational sign is to be expected when steps a) and b) are carried out once more.

10. A device for adjusting an angular position of a camshaft to a setpoint angular position via a final controlling element, the angular position related to an arc of a crankshaft rotation, the device comprising:
a final controlling element triggered by an actuating signal from a controlling device that becomes operational when a control program is run, the final controlling element being triggered in each case by one of an early value to re-adjust the camshaft toward an early opening of intake valves of an internal-combustion engine, a late value to re-adjust the camshaft toward a late opening of intake valves, and a hold value to retain the prevailing actual angular position;
a controlling device, the controlling device estimating a re-adjustment rate ($v\_ESTIMATED$) of the camshaft at a beginning of a subsequent program run, the controlling device estimating the adjustment angle from the re-adjustment rate and the known time response of the camshaft re-adjustment after a switch is made to the actuating signal from the hold value, the adjustment angle being the angular position to which the camshaft would still change, were the actuating signal to be changed to the hold value at the beginning of a next program run, the controlling device changing the actuating signal from one of the early and late values to the hold value when a deviation between the adjustment angle and the setpoint angular position lies within a tolerance band.

* * * * *

UNITED STATES PATENT AND TRADEMARK OFFICE
CERTIFICATE OF CORRECTION

PATENT NO. : 5,417,187

DATED : May 23, 1995

INVENTOR(S): Meyer et al.

It is certified that error appears in the above-identified patent and that said Letters Patent is hereby corrected as shown below:

In Column 4, lines 16, 18, 25-26 and 35
Column 6, lines 28, 48-49
Column 8, line 12
Column 10, lines 12-13 and 23-24, change "$a_{13}$ ESTIMATED" to --$a\_$ESTIMATED--;

In Column 4, line 47, change "...the respect..." to --...the final re-adjustment rate, which the camshaft reaches with respect...--;

In Column 5, lines 6 and 26
Column 6, lines 27, 49-50, change "$a_{13}$ ACTUAL" to --$a\_$ACTUAL--;

In Column 6, line 9, change "...reached. Step..." to --....reached.
¶ Step...--;

UNITED STATES PATENT AND TRADEMARK OFFICE
CERTIFICATE OF CORRECTION

PATENT NO. : 5,417,187

DATED : May 23, 1995

INVENTOR(S): Meyer et al.

It is certified that error appears in the above-identified patent and that said Letters Patent is hereby corrected as shown below:

In Column 7, line 31, change "...$d_{sw}$,..." to --...$d\_sw$--;

In Column 7, line 38, change "...$d_{sw}$in,..." to --...$d\_sw$ in--;

In Column 10, line 31, change "$\Delta t$" to --$\Delta t$--.

Signed and Sealed this

Eighteenth Day of March, 1997

*Attest:*

BRUCE LEHMAN

*Attesting Officer*   Commissioner of Patents and Trademarks